2,749,333
METAL-CONTAINING POLYAZO DYESTUFFS

Markus Kappeler and August Schweizer, Basel, Switzerland, assignors to Sandoz A. G., Basel, Switzerland, a Swiss firm No Drawing. Application December 18, 1953, Serial No. 399,156

Claims priority, application Switzerland December 24, 1952

6 Claims. (Cl. 260—145)

The present invention relates to new metal-containing polyazo dyestuffs.

A primary object of the invention is the embodiment of metal-containing polyazo dyestuffs of especial utility in the dyeing of leather. This object is realized by the dyestuffs according to the invention, which correspond to the formula

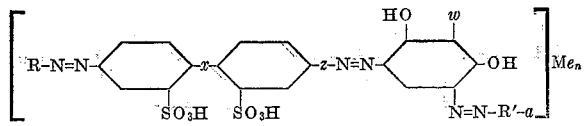

wherein $w$ stands for a hydrogen atom or a —N=N- mononuclear radical, $x$ stands for a —CH=CH— or —CH$_2$—CH$_2$-bridge, $z$ is a simple linkage or stands for azo-R$_1$, in which R$_1$ denotes a mono- or binuclear radical of the benzene series or a radical of the naphthalene series, -azo- being located in one of the positions meta and para to the respective —N=N-group, R stands for a mono- or binuclear radical of the benzene series or a radical of the naphthalene series, R'—$a$ stands for a radical of the benzene series, in which $a$ is a substituent capable of favouring metal complex formation and is present in ortho-position to the respective —N=N— group, and which radical may further be substituted for instance by water-solubilizing groups, e. g. the sulfonic acid or sulfonic acid amine group, Me stands for a heavy metal atom, and wherein $n$ is one of the numerals 1 and 2.

The new metal-containing polyazo dyestuffs are obtained by coupling 1 mol of the diazo compound from an aminoazo dyestuff of the composition

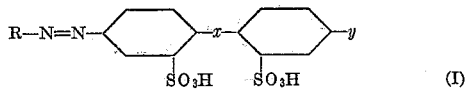

wherein $x$ and R have the previously cited significance, and $y$ is an amino group or the radical -azo-R$_1$—NH$_2$, in which R$_1$ denotes a mono- or binuclear radical of the benzene series or a radical of the naphthalene series, -azo- being located in one of the positions meta and para to —NH$_2$, with 1 mol of a monoazo compound of the composition

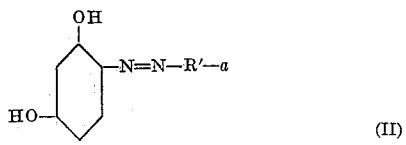

wherein R'—$a$ has the previously cited significance, and treating the polyazo dyestuff thus obtained with a metal-yielding agent.

It is possible to introduce the metal atom already in the coupling of the diazotized aminoazo dyestuff (I) with the monoazo compound (II) by taking, for example, the monoazo compound (II) in the form of its metal complex for coupling with the diazo compound (I). Furthermore, a second metal atom can be introduced into the polyazo dyestuff if the residue R$_1$ is chosen from those which contain, in ortho-position to —NH$_2$, a group capable of favouring metal complex formation.

Valuable polyazo dyestuffs can also be obtained if the end product is coupled with at most 1 mol of diazotized aminobenzene compound before or after treatment with a metallizing agent.

The sulfonamide groups which can be present in residue R' can be substituted on the nitrogen atom, whereby as substituents lower molecular alkyl groups come into favourable consideration, which on their part can be substituted by hydroxyl or alkoxy groups.

According to a further method of carrying out the invention, polyazo dyestuffs can also be prepared by coupling 1 mol of the diazo compound from an aminoazo dyestuff of composition (I) first with 1 mol of 1.3-dihydroxybenzene and then coupling the product obtained with 1 mol of the diazo compound from an aromatic amine of the composition $$b—R'—NH_2 \qquad (III)$$

wherein R'—$b$ stands for a radical of the benzene series, $b$ being a substituent capable of favouring metal complex formation and being present in ortho-position to —NH$_2$, and then treating the polyazo dyestuff thus obtained with a metal-yielding agent.

Also in this method of carrying out the process it is possible to couple the polyazo dyestuff with at most 1 mol of a diazotized aminobenzene compound before or after treatment with a metal-yielding agent.

If the symbol $b$ denotes a hydroxy group as the group capable of favouring metal complex formation this group can also be closed by an alkylsulfonyl or arylsulfonyl radical. If this is the case then the alklysulfonyl or arylsulfonyl radical must be split off before treatment of the end product with a metal-yielding agent.

The aminoazo dyestuff of composition (I) is advantageously diazotized indirectly and the coupling of the diazo compound thus obtained with the azo coupling component (II) according to the first form of carrying out the invention is generally effected in weakly alkaline solution. The coupling of the diazo compound with 1.3-dihydroxybenzene according to the second method of carrying out the invention takes place advantageously in a neutral to alkaline medium and that of the intermediate products thus obtained with diazotized aromatic amines of formula (III) likewise takes place with advantage in an alkaline medium. The polyazo dyestuffs obtained are worked up in the usual manner by salting out from the reaction solution, filtration, washing and drying.

The new dyestuffs can, according to the present invention, be obtained directly as metal complex compounds. As complex forming metals chromium, cobalt and nickel are very suitable, but most especially copper. If the polyazo dyestuffs are to be converted subsequently into their metal complex compounds then their metallization takes place advantageously with chromium, cobalt or nickel compounds and in particular with copper-yielding agents. The coppering can take place according to the most varied methods known from the literature as, for instance, by heating the dyestuff with copper salts in weakly acid to alkaline medium, if desired with the use of pressure and in the presence of ammonia or organic bases, or in the melt or alkali salts of lower molecular aliphatic monocarboxylic acids.

The new metal-containing dyestuffs can be used for the dyeing and printing of the most varied materials, as, for example, for the dyeing and printing of cotton and fibers of regenerated cellulose or of animal fibers such as wool and silk and artificial nitrogenous fibers in brown shades. They are also suitable for dyeing leather. Thus, for example, they give brilliant brown shades on chrome leather (box calf or chrome side leather), chrome suede leather and semi-chrome leather, on chrome tanned, chrome syntan or chrome vegetable tanned glove leather as well as on pure vegetable tanned leather. Furthermore they give on suede leather well penetrated brown shades which are fast to buffing. It may be emphasized that the dyestuffs possess a most excellent power of fixation on these various types of leather.

The following examples illustrate the invention. Therein the parts denote parts by weight, the percentages denote percentages by weight, and the degrees are in degrees centigrade.

EXAMPLE 1

64.3 parts of the amino-disazo dyestuff of the formula

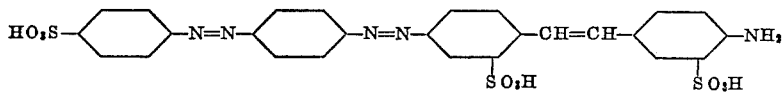

are dissolved in the form of the sodium salt thereof in 1000 parts of water, and are diazotized by the addition of a solution of 7 parts of sodium nitrite in 20 parts of water and 30 parts of 30% hydrochloric acid at 10°. The solution of the diazo compound is run into an ice-cooled solution of 37.2 parts of the copper complex compound of 2.2′.4′-trihydroxy-1.1′-azobenzene-5-sulfonic acid and 40 parts of sodium carbonate in 400 parts of water. After coupling is completed, the resultant polyazo dyestuff is separated out by the addition of sodium chloride, filtered off and dried. It corresponds to the formula

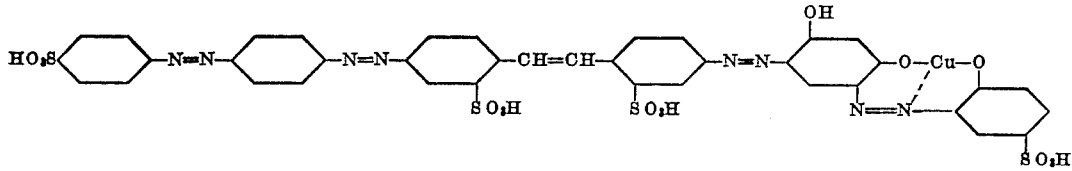

and dyes chrome suede leather with excellent power of exhaustion and good penetration power in brilliant reddish-brown shades. The dyeings are very fast to buffing and have good fastness to light.

If the resultant polyazo dyestuff before its isolation is coupled with 1 mol of diazotized 1-amino-4-nitrobenzene-2-sulfonic acid then a dyestuff is obtained which corresponds to the formula

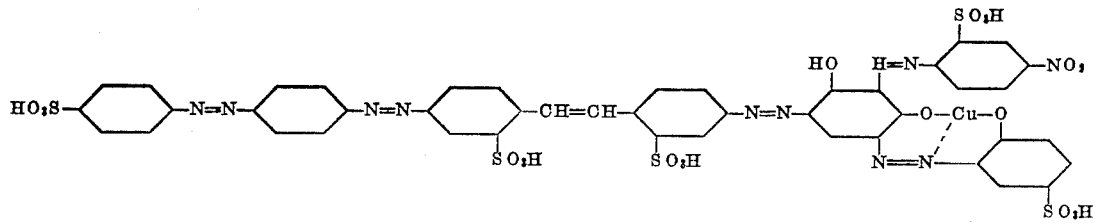

and dyes leather in neutral brown shades of similar properties.

EXAMPLE 2

If in the previous example, the 37.2 parts of the coupling component are replaced by 41.6 parts of the copper complex compounds of 2.2′.4′-trihydroxy-5-nitro-1.1′-azobenzene-3-sulfonic acid, then a similar dyestuff is obtained. It corresponds to the formula

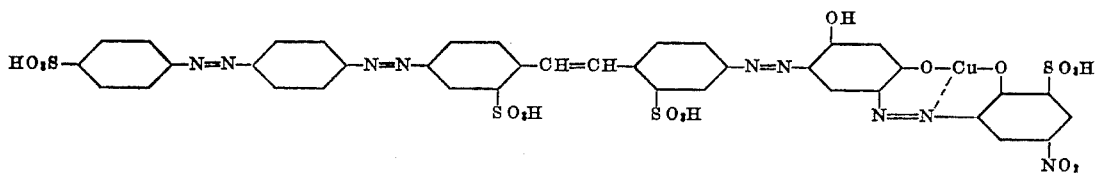

EXAMPLE 3

By replacing the coupling component of Example 1 by 36.7 parts of the cobalt complex compound of 2.2′.4′-trihydroxy-1.1′-azobenzene-5-sulfonic acid a dyestuff is obtained which dyes crome suede leather in bright brown shades fast to buffing and to light.

EXAMPLE 4

The dyestuff, obtained according to the method of Example 1 but using 36.0 parts of the chromium complex compound of 2.2′.4′-trihydroxy-1.1′-azobenzene-5-sulfonic acid instead of 37.2 parts of the respective copper complex compound, dyes chrome suede leather in yellowish-brown shades fast to buffing.

EXAMPLE 5

If the coupling component of Example 1 is replaced by 36.7 parts of the corresponding nickel complex compound, then the nickel-containing polyazo dyestuff is obtained. It corresponds to the formula

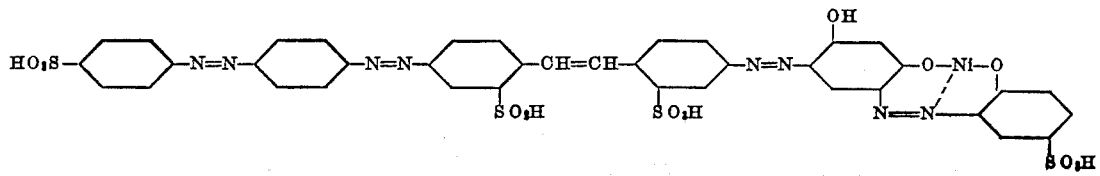

and dyes chrome suede leather in reddish-brown shades fast to buffing and to light.

EXAMPLE 6

47.5 parts of the amino-monoazo dyestuff of formula

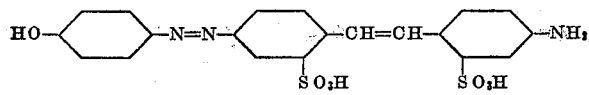

are diazotized according to the method of Example 1. The solution of the diazo compound is run into a solution of 11 parts of 1.3-dihydroxybenzene, 35 parts of sodium carbonate and 200 parts of water. After coupling has ensued, a further 40 parts of sodium carbonate are

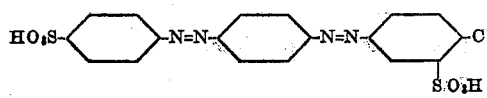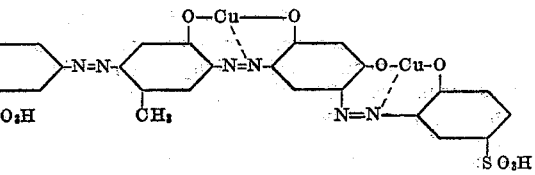

added to the solution. A solution of the diazo compound from 18.9 parts of 1-hydroxy-2-aminobenzene-4-sulfonic acid is then added thereto. After coupling is finished, the resultant polyazo dyestuff is separated out by the addition of sodium chloride to the coupling solution and the dyestuff filtered off.

For converting it into the copper complex compound the moist filter cake is dissolved at 60° in 1200 parts of water. To this solution 15 parts of sodium acetate and a concentrated aqueous solution of 25 parts of crystallized copper sulfate are added and the mass is stirred for 3 hours at 60–70°. The copper-containing polyazo dyestuff formed is salted out, filtered off and dried. It corresponds to the formula

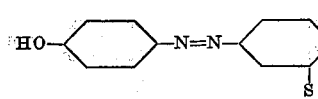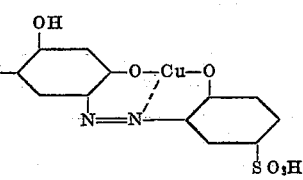

and is a dark brown powder which dyes chrome suede leather in bright reddish-brown shades fast to buffing.

EXAMPLE 7

79.1 parts of the amino-trisazo dyestuff of the formula

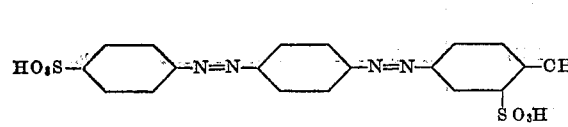

are diazotized according to the data of Example 1. The solution of the diazo compound is run into an ice-cooled solution of 32.2 parts of 2-methoxy-2'.4'-dihydroxy-1.1'-azobenzene-5-sulfonic acid and 40 parts sodium carbonate in 500 parts of water. After coupling is complete, the resultant polyazo dyestuff is isolated and is filtered off. The filter cake is then heated for several hours in aqueous solution and in the presence of ammonia and copper sulfate. The formation of the polyazo dyestuff containing 2 atoms of copper thereby ensues with splitting of the methoxy groups. The coppered products separated out by the addition of sodium chloride is filtered off and dried. It corresponds to the formula

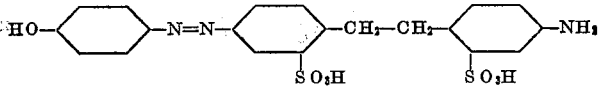

and dyes chrome suede leather in deep dark brown shades.

EXAMPLE 8

47.7 parts of the amino-monoazo dyestuff of the formula

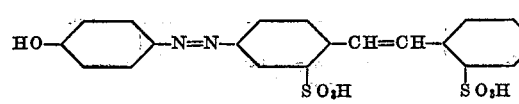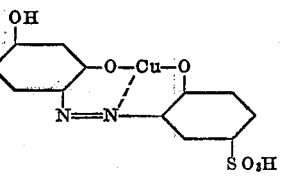

are dissolved in the form of its sodium salt in 800 parts of water and diazotized by the addition of 7 parts of sodium nitrite and 30 parts of 30% hydrochloric acid. The diazo solution is run into a solution of 37.2 parts of the copper complex compound from 2.2'.4'-trihydroxy-1.1'-azobenzene-5-sulfonic acid in 35 parts of sodium carbonate in 450 parts of water. The resultant copper-containing polyazo dyestuff is precipitated out from the solution by the addition of sodium chloride and is filtered off and dried. It corresponds to the formula and is a brown powder which dissolves in water with a brown color and dyes chrome suede leather in brown shades.

EXAMPLE 9

A polyazo dyestuff which dyes chrome suede leather a somewhat deeper brown than that obtainable according to the previous examples is obtained if the 47.7 parts of the aminomonoazo dyestuff of the foregoing example is replaced by 62.5 parts of the amino-disazo dyestuff of

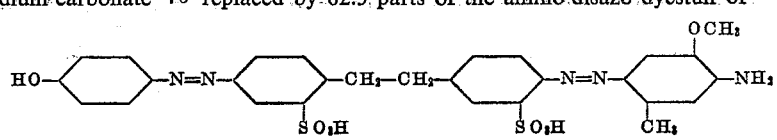

In the resultant polyazo dyestuff of the formula

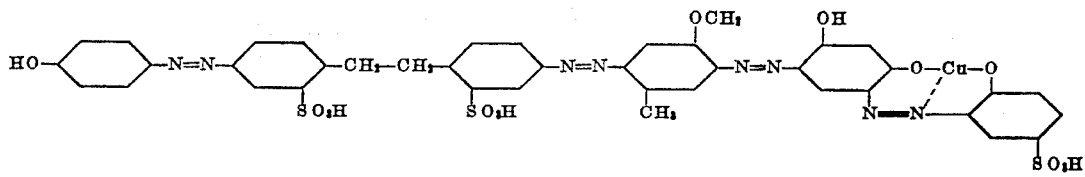

a second atom of copper in complex combination can be introduced with splitting of the methoxy group, whereby a dyestuff is obtained which dyes chrome suede leather in dark brown shades.

The following Table 1 includes further metal-containing polyazo dyestuffs which can be obtained according to one of the methods of working described in the previous examples. Therein the aminoazo dyestuffs of formula (I) are shown in column (A), and the monoazo compounds of formula (II) present as copper complexes are shown in column (B). The column (Aa) gives the aromatic compound R—H which corresponds to the radical R contained in the formula (I)

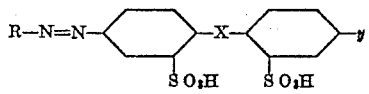

whereas in the column (Ab) the symbols y of the above shown formula are shown. In all the aminoazo dyestuffs of the formula (I), x stands for the CH=CH— bridge. In column (C) the shade of dyeing on the chrome suede leather is given.

The Table 2 shows polyazo dyestuffs which are metallized in substance. The column (B) in this case gives the unmetallized monoazo compounds (II) used for their preparation and the column (C) gives the shade of dyeing of the copper complex compounds on chrome suede leather.

*Table 1*

| Example No. | (A) | | (B) | (C) |
|---|---|---|---|---|
| | (Aa) R—H = | (Ab) y = | Copper complex compound from— | |
| 10 | benzene(1)-4-sulfonic acid | —NH₂ | 2.2'.4'-trihydroxy-3-carboxy-1.1'-azobenzene-5-sulfonic acid. | brown. |
| 11 | ...do... | —NH₂ | 2.2'.4'-trihydroxy-1.1'-azobenzene-5-sulfonic acid amide. | reddish-brown. |
| 12 | ...do... | —NH₂ | 2.2'.4'-trihydroxy-1.1'-azobenzene-5-sulfonic acid methylamide. | Do. |
| 13 | ...do... | —NH₂ | 2.2'.4'-trihydroxy-1.1'-azobenzene-5-sulfonic acid (β-hydroxy)-ethylamide. | Do. |
| 14 | ...do... | —NH₂ | 2.5-dimethoxy-2'.4'-dihydroxy-1.1'-azobenzene-4-sulfonic acid. | Do. |
| 15 | ...do... | —NH₂ | 2.2'.4'-trihydroxy-5-ethoxy-1.1'-azobenzene-4-sulfonic acid. | Do. |
| 16 | ...do... | —NH₂ | 2.2'.4'-trihydroxy-1.1'-azobenzene-5-sulfonic acid. | brown. |
| 17 | benzene(1)-3-sulfonic acid | —NH₂ | ...do... | Do. |
| 18 | naphthalene(1)-6-sulfonic acid | —NH₂ | ...do... | Do. |
| 19 | naphthalene(2)-4.8-disulfonic acid | —NH₂ | ...do... | Do. |
| 20 | 4-methoxybenzene(1) | —NH₂ | ...do... | Do. |
| 21 | 4-hydroxybenzene(1)-3-carboxylic acid. | —NH₂ | 2.2'.4'-trihydroxy-3-nitro-1.1'-azobenzene-5-sulfonic acid. | Do. |
| 22 | 1-hydroxynaphthalene(2)-3.6-disulfonic acid. | —NH₂ | ...do... | red-brown. |
| 23 | 2-hydroxynaphthalene(1)-3.6-disulfonic acid. | —NH₂ | ...do... | Do. |
| 24 | benzene(1)-4-sulfonic acid | —N=N—⌬(CH₃)—NH₂ | 2.2'.4'-trihydroxy-1.1'-azobenzene-5-sulfonic acid. | brown. |
| 25 | ...do... | —N=N—⌬(OCH₃)(CH₃)—NH₂ | ...do... | Do. |
| 26 | ...do... | —N=N—⌬(COOH)—NH₂ | ...do... | Do. |
| 27 | benzene(1)-4-carboxylic acid | —N=N—⌬(COOH)—NH₂ | ...do... | Do. |
| 28 | benzene(1)-3-sulfonic acid | —N(O)—N—⌬—⌬(SO₃H)—NH₂ | ...do... | Do. |

Table 1.—Continued

| Example No. | (A) (Aa) R—H = | (A) (Ab) y = | (B) Copper complex compound from— | (C) |
|---|---|---|---|---|
| 29 | benzene(1)-3-sulfonic acid | —N=N—⟨OCH₃, NH₂, SO₃H⟩ | 2.2′.4′-trihydroxy-1.1′-azobenzene-5-sulfonic acid. | red-brown. |
| 30 | 4-hydroxybenzene(1) | —N=N—⟨NH₂, SO₃H⟩ | ......do...... | brown. |
| 31 | 4-ethoxybenzene(1) | —N=N—⟨NH₂, SO₃H⟩ | ......do...... | Do. |
| 32 | 4-butoxybenzene(1) | —N=N—⟨NH₂, SO₃H⟩ | ......do...... | Do. |
| 33 | 2-methyl-1.1′-azobenzene(4)-3′-sulfonic acid. | —NH₂ | 2.2′.4′-trihydroxy-5-chloro-1.1′-azobenzene-3-sulfonic acid. | Do. |
| 34 | 1.1′-azobenzene(4)-4′-carboxylic acid. | —NH₂ | ......do...... | Do. |
| 35 | 6′-chlor-1.1′-azobenzene(4)-3′-sulfonic acid. | —NH₂ | 2.2′.4′-trihydroxy-1.1′-azobenzene-5-sulfonic acid. | Do. |
| 36 | 1.1′-azobenzene(4)-3′-carboxylic acid. | —NH₂ | ......do...... | Do. |
| 37 | 1-phenylazonaphthalene(4)-6.4′-disulfonic acid. | —NH₂ | ......do...... | Do. |
| 38 | 1-naphthyl(2′)-azo-2-methylbenzene(4)-4′.8′-disulfonic acid. | —NH₂ | ......do...... | Do. |
| 39 | 4′-hydroxy-1.1′-azobenzene(4)-2-sulfonic acid. | —NH₂ | 2.2′.4′-trihydroxy-3-chloro-1.1′-azobenzene-5-sulfonic acid. | Do. |
| 40 | 4′-methoxy-1.1′-azobenzene(4)-2-sulfonic acid. | —NH₂ | ......do...... | Do. |
| 41 | 4′-(4″-methoxy)-phenyl(1″)-azo-1.1′-diphenyl(4)-3′-sulfonic acid. | —NH₂ | ......do...... | Do. |
| 42 | 1.1′-azobenzene(4)-4′-sulfonic acid. | —N=N—⟨NH₂⟩ | 2.2′.4′-trihydroxy-1.1′-azobenzene-5-sulfonic acid. | Do. |
| 43 | ......do...... | —N=N—⟨OC₂H₅, NH₂, OC₂H₅⟩ | ......do...... | Do. |
| 44 | ......do...... | —N=N—⟨OCH₃, NH₂⟩ | ......do...... | Do. |
| 45 | ......do...... | —N=N—⟨SO₃H, NH₂⟩ | ......do...... | Do. |
| 46 | ......do...... | —N=N—⟨⟩—⟨SO₃H, NH₂⟩ | ......do...... | Do. |
| 47 | 2-methyl-1.1′-azo-benzene(4)-3′-sulfonic acid. | —N=N—⟨COOH, NH₂⟩ | ......do...... | Do. |
| 48 | 1-phenylazonaphthalene(4)-7.4′-disulfonic acid. | —N=N—⟨OCH₃, NH₂, CH₃⟩ | ......do...... | Do. |
| 49 | 4′-hydroxy-1.1′-azobenzene(4)-2-sulfonic acid. | —N=N—⟨NH₂⟩ | 2.2′.4′-trihydroxy-5-methyl-1.1′-azobenzene-3-sulfonic acid. | Do. |
| 50 | 4′-methoxy-1.1′-azobenzene(4)-2-sulfonic acid. | —N=N—⟨NH₂, SO₃H⟩ | ......do...... | Do. |

The dyestuffs of Examples 25, 29, 43, 44 and 48 can be further coppered in substance with simultaneous dealkylation, whereby the dyeing shade of their dyeings on chrome suede leather is shifted towards deep brown.

Also the dyestuffs of Examples 21, 26, 27 and 47 can, in substance as well as on the fiber (e. g. fibers of cellulose), be further coppered. The color of the dyeings is in this case only slightly shifted towards deep brown.

Table 2

| Example No. | (A) | | (B) | (C) |
|---|---|---|---|---|
| | (Aa) R—H= | (Ab) y= | | |
| 51 | benzene(1)-4-sulfonic acid | —NH$_2$ | 2-carboxy-2'.4'-dihydroxy-1.1'-azobenzene-4-sulfonic acid. | Brown. |
| 52 | ----do---- | —NH$_2$ | 2-carboxy-2'.4'-dihydroxy-1.1'-azobenzene-4-sulfonic acid amide. | Do. |

EXAMPLE 53

100 parts of well neutralized chrome calf leather are entered in a vat containing 200 parts of water of 60°. A solution of 1 part of the polyazo dyestuff obtained according to Example 1 in 30 parts of water is added in two or three portions within 15 minutes. After 30 minutes the dye vat is treated with 1.8 parts of 10% formic acid. The product is milled for a further 20 minutes and the chrome calf leather is thereupon fatliquored in a fresh bath in the usual manner.

EXAMPLE 54

100 parts of chrome suede leather, milled with 2% of concentrated ammonia and 0.5% of a non-ionic wetting agent, are entered in a vat containing 500 parts of water of 60°. To the rotating dye-bath there is added through the hollow axis a solution of 8 parts of the dyestuff obtained according to Example 1 and 2 parts of concentrated ammonia in 2400 parts of water. When a sufficient dyeing penetration is obtained, 75 parts of 5% formic acid are added to the dye-bath. After exhaustion of the dye-bath the chrome suede leather is withdrawn and rinsed in water.

Having thus disclosed the invention what is claimed is:

1. A polyazo dyestuff which corresponds to the formula

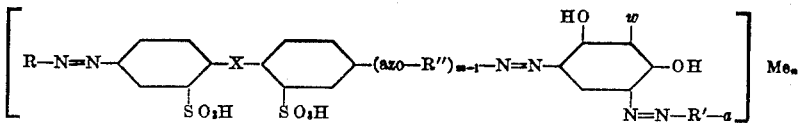

wherein $w$ stands for a member selected from the group consisting of a hydrogen atom and a —N=N— mononuclear aryl radical, $x$ stands for a bridge selected from the group consisting of —CH=CH— and

—CH$_2$—CH$_2$—

R stands for a member selected from the group consisting of a mononuclear and a binuclear radical of the benzene series and a radical of the naphthalene series, R'' stands for a member selected from the group consisting of a mononuclear and a binuclear radical of the benzene series and a radical of the naphthalene series, and -azo- being located in one of the positions meta and para to the respective —N=N— group, R'—a stands for a radical of the benzene series, in which $a$ is a substituent selected from the group consisting of hydroxy, methoxy and carboxy and is present in ortho-position to the respective —N=N— group, Me stands for a metal atom selected from the group consisting of a chromium, cobalt, nickel and copper atom, and wherein $m$ and $n$ each is one of the numerals 1 and 2.

2. The polyazo dyestuff which corresponds to the formula

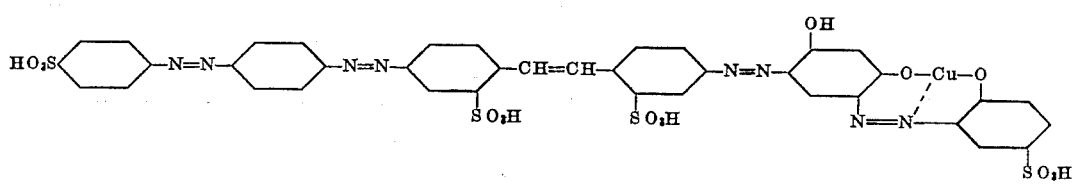

3. The polyazo dyestuff which corresponds to the formula

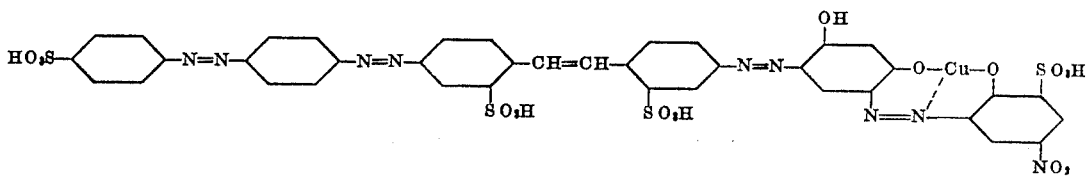

4. The polyazo dyestuff which corresponds to the formula

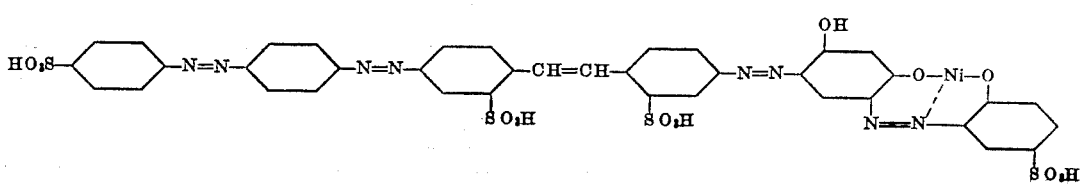

5. The polyazo dyestuff which corresponds to the formula
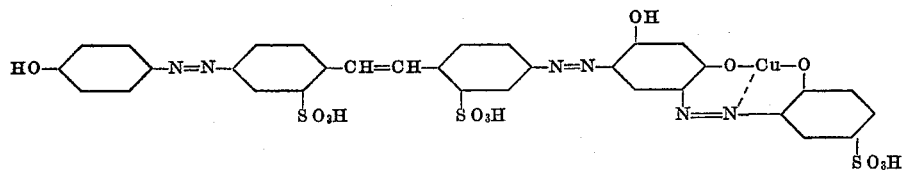
6. The polyazo dyestuff which corresponds to the formula
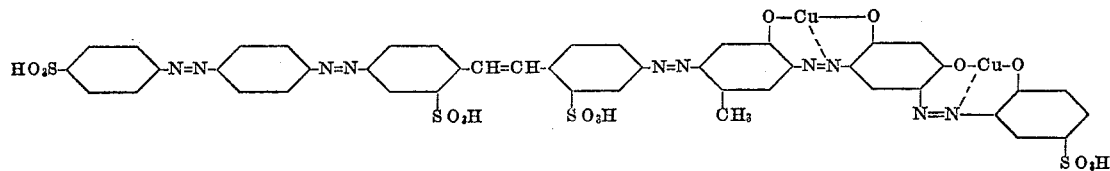
References Cited in the file of this patent
UNITED STATES PATENTS
| | | |
|---|---|---|
| 2,197,350 | Schindhelm et al. | Apr. 16, 1940 |
| 2,518,020 | Kappeler | Aug. 8, 1950 |
| 2,574,782 | Gunst | Nov. 13, 1951 |
| 2,673,200 | Ruckstuhl et al. | Mar. 23, 1954 |
FOREIGN PATENTS
| | | |
|---|---|---|
| 674,708 | Great Britain | Jan. 25, 1952 |